L. McLELLAN.

CULINARY BOILER.

No. 10,199. Reissued Sept. 19, 1882.

WITNESSES:

C. Neveux

C. Sedgwick

INVENTOR:

L. McLellan

BY Munn & Co

ATTORNEYS.

N. PETERS, Photo-Lithographer, Washington, D. C.

UNITED STATES PATENT OFFICE.

LEWIS McLELLAN, OF GORHAM, MAINE.

CULINARY BOILER.

SPECIFICATION forming part of Reissued Letters Patent No. 10,199, dated September 19, 1882.

Original No. 89,419, dated April 27, 1869. Application for reissue filed May 1, 1882.

*To all whom it may concern:*

Be it known that I, LEWIS McLELLAN, of Gorham, in the county of Cumberland and State of Maine, have invented certain new and useful Improvements in Culinary Boilers for Cooking Food Products, including Canned Corn; and I do hereby declare that the following is a full, clear, and exact description of the same.

Reference is to be had to the accompanying drawings, forming part of this specification, in which similar letters of reference indicate corresponding parts in both the figures.

Figure 1:
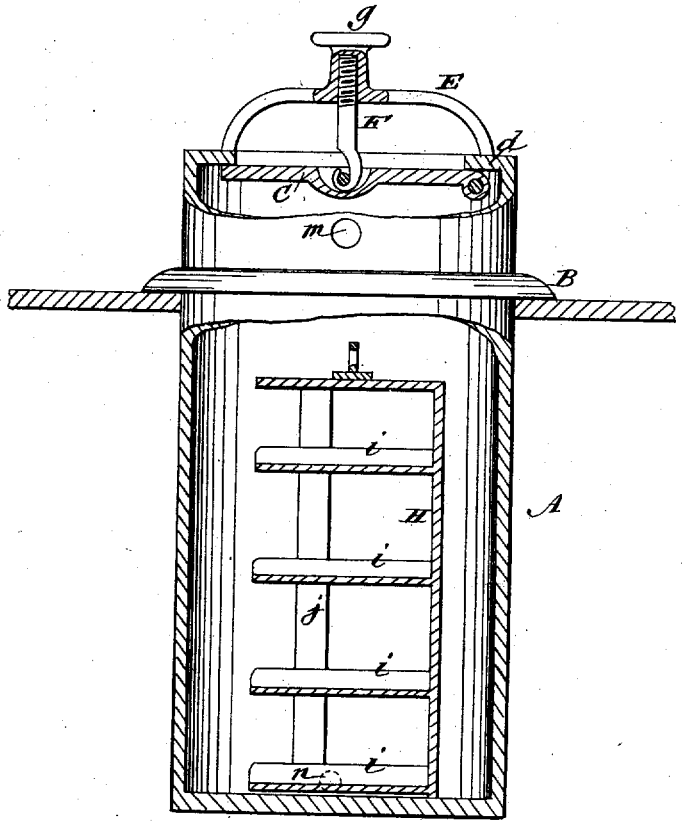
Figure 2:
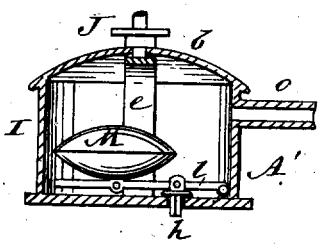

Figure 1 represents a vertical section of a vessel for cooking food products, constructed in accordance with my invention and provided with a rack or series of removable shelves on which pans containing the cans of corn or other articles may be placed for cooking. Fig. 2 is a vertical section of a steam-trap that may be used in connection with said vessel.

This invention relates to a new and improved vessel for cooking, boiling, or preparing corn and other articles which it is designed to preserve in hermetically-sealed cans; and it consists in the peculiar construction of the boiler or vessel, and in the combination, with a steam-trap, of said boiler or vessel, wherein is placed the corn or other article to be cooked by steam at a temperature higher than 212° Fahrenheit, or by boiling under pressure, as may be deemed most proper for the article to be prepared, as will be hereinafter more fully described.

A in the drawings indicates a boiler or vessel, of any suitable shape, material, and size.

B is a flange which allows the vessel to be suspended from a floor or shelf, as represented in Fig. 1.

C is the door, which is hinged to the under side of the flange or head *d*, which, when closed, is made steam-tight with suitable packing.

E is a bail, the ends of which rest upon the flange *d*.

F is a screw-hook, which hooks onto a wrist in the door and passes up through the bail, with a knob-nut, *g*, upon its upper end, so that when closed the door can be drawn tightly up and made steam-tight against the lower side of the flange *d*.

H is a rack of shelves, which shelves may be more or less in number and of any suitable size, and be either fixed or adjustable.

*i* represents the shelves, and *j* stays or bars by which the shelves are supported. The shelves contain the pans of corn or other article in cans to be cooked, and the rack containing the cans is lowered down into the vessel, and the door is closed. Steam is admitted through the aperture marked *m*.

*n* is an orifice near the bottom of the vessel A for the discharge of the water of condensation, and connected with said vessel is a valve or trap, I, to prevent the escape of steam, and so that water may be retained in the vessel, if desired, during the process of cooking or treating the food products. The trap I is formed of a cylindrical vessel, A′, connected to the discharge-opening *n* in the vessel A by means of a lateral pipe, O.

*b* is the cover of the trap, which is supported by a bail, *e*, and held in place by means of a screw rod and nut, J. The bottom of the trap is provided with a discharge-opening in which a valve, *h*, attached to a pointed arm, *l*, works.

M is a float attached to the arm *l*, and when this float is raised by the water of condensation the valve *h* is also raised sufficiently to discharge such water. It should be observed that the water will be discharged before it reaches the level of the pipe O.

When the corn or other article is sufficiently cooked or treated the vessel A is opened and the rack, with its vessels containing the food product, is hoisted out.

The vessel A may be placed over a fire, in a suitably-constructed furnace, and may be supplied with water, where the corn or other food product may be subjected to any desired degree of heat; but I prefer the use of steam, introduced as described, as by the steam process the corn, for instance, changes color less than when it is cooked by boiling in water.

By cooking the corn or other food product in a closed vessel under pressure the time required for the process is greatly lessened and the article less injured than by boiling in the ordinary manner.

Having thus fully described my invention, I claim as new and desire to secure by Letters Patent—

1. The boiler or vessel A, constructed as described, and provided with the steam-supply opening *m*, the hinged cover C, bail E, hook F, and nut *g*, substantially as described, and for the purpose set forth.

2. The combination, with the boiler or vessel A, provided with the steam-supply opening *m*, hinged cover C, bail E, hook F, and nut *g*, of the rack H, substantially as described, and for the purpose set forth.

3. The trap I, in combination with the vessel A, constructed as described, and provided with the flange B, steam-supply opening *m*, the hinged cover C, bail E, hook F, nut *g*, and rack H, as herein set forth, for the purpose specified.

LEWIS McLELLAN.

Witnesses:
EVA F. PAINE,
STEPHEN HINCKLEY.